United States Patent [19]

Sadier

[11] Patent Number: 4,864,715
[45] Date of Patent: Sep. 12, 1989

[54] PROCESS FOR WINDING A WOUND STATOR OF AN ELECTRIC ROTATING MACHINE

[75] Inventor: Jacques Sadier, Nevers, France

[73] Assignee: Equipements Electriques Moteur Societe Anonyme, Creteil, France

[21] Appl. No.: 144,227

[22] Filed: Jan. 15, 1988

[51] Int. Cl.$^4$ .......................................... H02K 15/06
[52] U.S. Cl. ........................................ 29/596; 29/605; 29/606; 140/92.1
[58] Field of Search ................. 29/596, 598, 606, 605; 310/42, 208; 140/92.1, 92.2

[56] References Cited

U.S. PATENT DOCUMENTS

| 4,131,988 | 1/1979 | Finegold | 29/596 |
| 4,449,288 | 5/1984 | Disclaire et al. | 29/596 |
| 4,739,643 | 4/1988 | Kuriyama et al. | 29/596 X |

FOREIGN PATENT DOCUMENTS 1532522  5/1967  France .
2408937  6/1979  France .
2483702  12/1981  France .

Primary Examiner—Carl E. Hall
Attorney, Agent, or Firm—Browdy & Neimark

[57] ABSTRACT

A wound stator of an electric rotating machine, with wavy-type winding, for an electric machine requiring relatively small amounts of power consisting of a plurality of slots and an arrangement of wires comprising first portions of phase windings located outside of the slots forming spread-out layers with the wires being arranged in a side-by-side relationship to one another, and second portions of phase windings located inside the slots, the second portions appearing like several superposed layers of juxtaposed parallel wires. The wire is initially shaped in a zigzag outside the stator, then cut in sections corresponding to phase windings. Each wire section is then wound on a receiving wheel, constituting a temporary support, after which it is transferred to the slots of the stator. During initial shaping of the wire in a zigzag, indentations are made whose height and width determine the arrangement of the wires of complete stator.

9 Claims, 7 Drawing Sheets

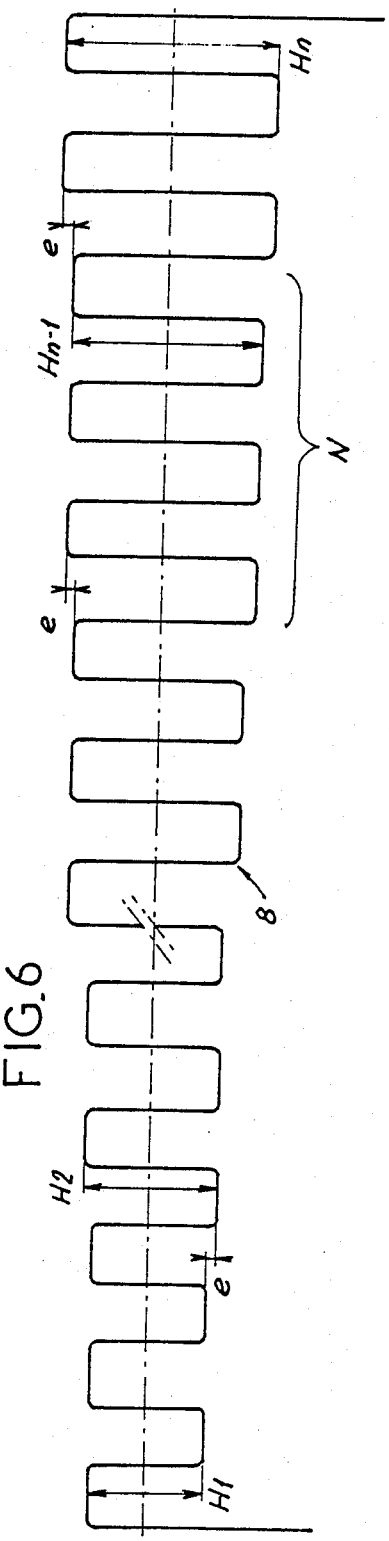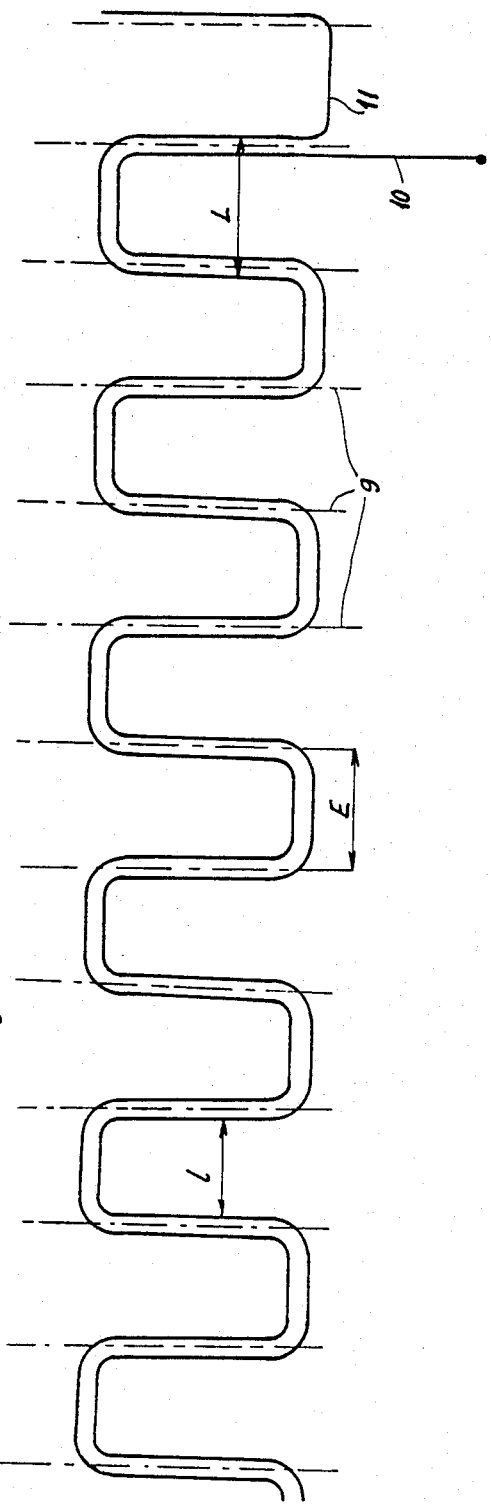

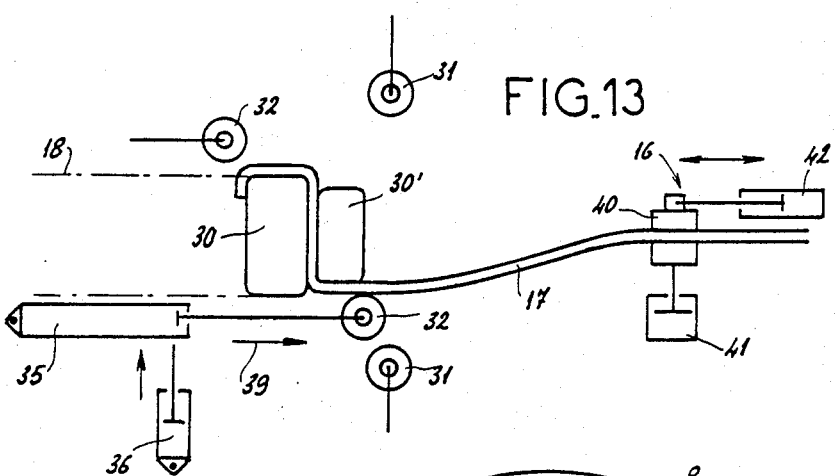
FIG.13
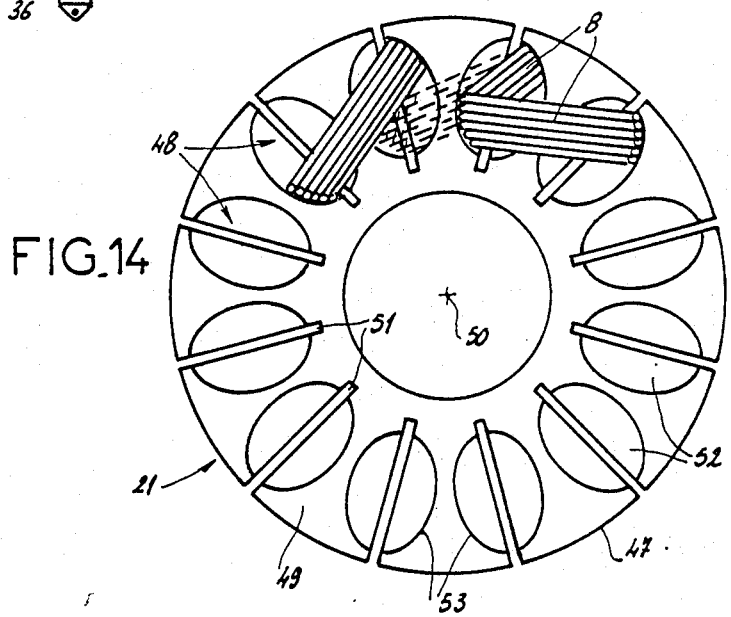
FIG.14
FIG.15
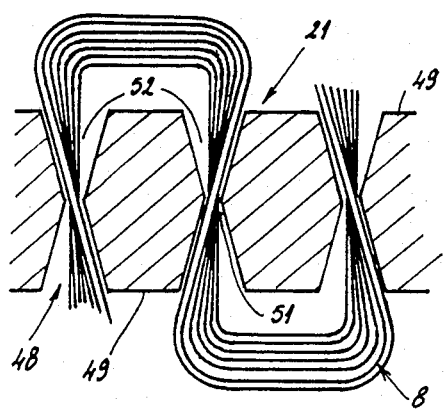

PROCESS FOR WINDING A WOUND STATOR OF AN ELECTRIC ROTATING MACHINE

BACKGROUND OF THE INVENTION

1. Field of the Invention

The present invention relates to a wound stator of an electric rotating machine, the process of winding the stator, and a device for using this winding process. The present invention relates more particularly to making of stators with "wavy" type windings for electric rotating machines having relatively slight power, such as alternators equipping motor vehicles.

2. The Prior Art

The stator of an alternator, such as is used in the equipment of motor vehicles, usually consists of a stack of thin sheets forming a crown where the inside face is provided with slots receiving the phase windings, generally three. In alternator stators of this type, the types of windings most often used are, on the one hand, windings consisting of coils closed on themselves and intercrossed which surround the poles, and, on the other hand, of the "wavy" type windings which are known, for example, from French patent Nos. 1,532,522, 2,408,937 and 2,483, 702.

A "wavy" type winding, to which the present invention particularly relates, comprises phase windings formed by conductors which successively go into a first slot of the stator, join a second slot on the outside, go into this second slot, reach on the outside of the third slot which is distinct from the preceding ones and located beyond, and so forth, to form a coil having a zigzag path or in an indented line. FIG. 1 of the accompanying schematic drawing reveals, in developed representation, this known principle in the case of a stator of three-phase alternator, the three phases being indicated as 1, 2, and 3, while there is mentioned as element 4 the stack of sheets with slots 5.

Windings of the type mentioned above are made either "on site,", i.e. the stator itself, by special machines, or previously formed outside the stator, then put in place in slots of the stator as provided in French patent No. 2,483,702 cited above.

In this case, the coils constituting the phases of the stator are made up of unarranged wires and, further, the ends of these coils, i.e. their part located outside the slots, overlap as can be seen in FIG. 2. Such a configuration does not permit an optimal direct cooling of the alternator; therefore, the coils must be partly cooled by heat conduction between the wires of these coils and the stack of stator sheets.

The absence of correct arrangements of the wires is also shown, on the inside stator slots, by an insufficient filling of these slots. Thus, to house the wires the slots must have a considerable depth, which increases the thickness of the stator and can result:

either in an increase of the outside diameter of the electric rotating machine, or in a reduction of the diameter of the rotor, itself causing a limitation of power of the electric rotating machine.

The invention aims at eliminating these drawbacks, therefore at obtaining an improvement of the cooling of the stator coils, as well as a reduction of the size or an increase of power of the electric rotating machine.

SUMMARY OF THE INVENTION

For this purpose, the object of the present invention is a wound stator of an electric rotating machine, with "wavy" type windings, in which there is provided an arrangement of the wires of all the phase windings in the coil ends, i.e. the parts of the phase windings located outside the slots, these parts forming spread-out layers with wires arranged side by side, and/or in the located outside the slots, these parts forming spread-out layers with wires arranged side by side, and/or in the parts of the phase windings located on the inside of the slots, these latter parts being like several superposed layers of juxtaposed parallel wires.

The wire parts, located side by side at the level of the coil ends, thus form spread-out layers which considerably improve the cooling of the coil ends, assured, for example, by means of a fan inside the electric rotating machine and driven by the rotor. Further, if the wires are thus arranged regularly inside the slots, filling of these slots is optimized and their depth can consequently be reduced. Thus, for an electric rotating machine of given power, the outside diameter of the stator can be reduced; correlatively, for an electric rotating machine of a given outside diameter, it is possible to increase the diameter of the rotor, therefore to increase the power. Reduction of the depth of the slots also allows a certain gain in material and weight, on a machine of given power.

This invention also proposes a process for winding such a stator with arranged rows, this process making it possible to form the winding and to put it in place economically, simply, reliably and guaranteeing the desired arrangement for the wires.

For this purpose, the invention has as its object a process for winding a stator with "wavy" type windings, as defined above, in which successively:

outside the stator, an electric wire is shaped zigzag by indentations in the wire having increasing or decreasing heights and determined widths;

this wire is cut into sections whose lengths correspond to that of a phase winding of the stator;

each section of wire is wrapped in several turns on a temporary support, by superposing indentations of increasing or decreasing heights; and the temporary support is introduced in the stack of stator sheets, and its wire section is transferred from this temporary support of the stator slots.

The invention thus consists in forming the wire in a particular way, then transferring the wire onto the stator so that the close wire parts, particularly at the level of the coil ends and also in its slots, naturally come to place themselves beside one another to form spread-out layers and superposed layers desired in the arrangement of wires defined above.

The wire can particularly have shapes with a successive series of indentations, each series comprising a predetermined number of indentations all having the same height, and the height of these indentations increasing or decreasing from one series to the next, each series corresponding to a complete turn of the coil. The difference in height of indentations between two successive series, on each side, is preferably approximately equal to the thickness of the wire, finally to obtain an exact juxtaposition of the wire parts in the coil ends.

Further, to obtain the correct alignment of the wires inside the slots, there are advantageously provided, in the initial zigzag configuration, successive groups of indentations having widths of different indentations, determined so that the wire parts are exactly juxtaposed in each of the superposed wire layers finally taking their place in the stator slots.

More particularly, in the simplest case where each wire layer is formed with two juxtaposed wire parts in each slot of the stator, there is successively formed, to obtain each layer, a first group of indentations of determined height and width slightly less than the center distance of axes of two consecutive slots indented for the same phase, then a second group of indentations of the same height as the preceding one but with a width greater than the center distance of the axes, or vice versa, so that the two wire positions, corresponding respectively to these groups of indentations, follow parallel paths without crossing. The same principle, of course, applies to the formation of all wire layers of the same phase winding.

The above-described process for forming wire, and of a section of desired length, applies to all phase windings. The wire sections corresponding to different phases are successively inserted in the stator slots, always passing by means of a temporary support constituting a sort of "false rotor". If necessary, a compacting of the wire in the bottom of the slots is performed during its final transfer into the stator to make sure, during the placement phase, that some parts are introduced correctly into the slots.

The device according to the invention, intended for using the winding process defined above, comprises in combination:

means for feeding the electrically conductive wire that is to be shaped;

means for shaping this wire in a zigzag, forming indentations of increasing or decreasing height and of predetermined widths;

means for cutting the wire shaped in a zigzag for separating the wire into sections whose length corresponds to that of a phase winding;

means for picking up each section of cut wire and for winding it in several turns on a receiving wheel constituting a temporary support for this wire section;

means for introducing the receiving wheel, equipped with a wire section, on the inside of the stack of stator sheets, and for the transfer of the wire section from the receiving wheel to the stator slots.

The means for shaping the wire in a zigzag comprise, in an embodiment of the device, essentially an endless chain connected to step-by-step drive means, the links of this endless chain comprising on their outside faces approximately rectangular templates whose assembly corresponds to the totality of the indentations to be made to form a phase winding, means being provided to apply the wire against the edges of these templates as the ire is fed to said endless chain. Each link can comprise a single template corresponding to an indentation to be made, the endless chain still having an inactive zone making it possible to go from the formation of one phase winding to the formation of the next phase winding while leaving, between two successive windings, a certain length of wire without indentations which is necessary for the electric connections of these phase windings in the completed stator.

The device further comprises in the zone where the wire is fed to the chain, and on both sides of this chain, a first shaping roller, perpendicularly movable in the direction of advance of the chain, and a second shaping roller, moveable parallel to the direction of advance of the chain. The shaping rollers are operated, for example, by means of cylinders to apply the wire against the edges of templates, carried by the links of the endless chain, to constitute indentations taking the shape of the templates exactly. It should be noted that feeding of the wire to the endless chain is preferably performed in a zone for changing the direction of this chain, so that during formation of an indentation on a template, carried by a link of the endless chain, the next link of this chain forms an angle relative to the plane of the preceding link, and thus allows the free passage of the shaping rollers which work with the template of the preceding link.

According to another characteristic of the device according to the present invention, the means for picking up each cut wire section and for winding it on a receiving wheel comprises, on the one hand, guides for tangential feeding of the wires to the receiving wheel, and on the other hand, means for rotatably driving said receiving wheel. During this driving in rotation, the cut wire section, corresponding to a phase winding, is transferred to the receiving wheel on which it is wound in several turns to constitute a winding which is the configuration of the final phase winding of the stator to be wound. Mobile pressers can be placed, in addition, on both sides of the zone where the wire sections reach the receiving wheel, to participate in placing the wires on this wheel with arrangement of the wires in the parts corresponding to the end coils.

To perfectly perform the functions of receiving wire sections and finally transferring these wire sections to the stack of stator sheets, the receiving wheel must take on a particular configuration as follows.

The receiving wheel must particularly have an outside diameter slightly less than the inside diameter of the stator to be wound, and a thickness approximately equal to that of the stator to be wound, the periphery of this receiving wheel being provided with slots whose circumferential pitch corresponds to the pitch of the slots allocated to one of the phases of the stator to be wound, while the depth of the slots of the receiving wheel is provided to allow stacking, inside these slots, of all the coils of the wire section wound in several turns on the receiving wheel. During removal of the wire section, the slots of the receiving wheel receive the corresponding parts of the wire, each slot of the receiving wheel finally being loaded with the number of wire parts necessary for constituting a phase winding of the stator.

More particularly, the slots of the receiving wheel have a shape symmetrical relative to a median plane perpendicular to the axis of the receiving wheel with parts widening on both sides of the median plane preferably in a "V" shape and coming out respectively on the two end faces of the receiving wheel. The widened parts of the slots form clearances which allow the indentations of the winding, being formed, to stack up radially by forming "chords" of constant length although some of these indentations are located closer to the axis while others are farther away from the axis of the receiving wheel.

The widened parts of the slots of the receiving wheel can particularly have, on the end face of this wheel, openings with an oval, pear-shaped or drop-shaped contour. This configuration for the slots allows, in the final operation of making and putting each phase in place, an easy, jam-free removal of the coils, radially well aligned, for their transfer into the stator slots without deformation of the parts which will not be imprisoned in these slots and are to form the spread-out layers of the coil ends.

A manipulator, such as a swinging arm, can be used to transfer the receiving wheel, provided with a winding corresponding to a phase, to the stack of stator sheets that is to receive this winding, the manipulator being able simultaneously to feed another identical receiving wheel, which will receive a new phase winding. The final operation of transferring each winding from the temporary support to the stator can be performed by expelling elements such as pins or hooks or blades driven in a rectangular movement.

BRIEF DESCRIPTION OF THE DRAWINGS

In any case, the invention will be better understood from the following description with reference to the accompanying schematic drawings showing a wound stator of an electric rotating machine according to the invention, illustrating the process of winding the stator and representing an embodiment of the device for using this process, all this obviously by way of nonlimiting examples, in which:

FIG. 6 represents in a general way, in a flat developed view, a section of wire shaped in zigzag according to the process of the invention, and corresponding to a phase winding;

FIG. 7 shows with greater precision a part of the wire section with superposed representation of two groups of indentations;

FIGS. 11, 12, and 13 are diagrams illustrating the functioning of the device of FIGS. 9 and 10, and more particularly the formation of indentations;

FIG. 14 is a front view of the receiving wheel, provided with wire;

FIG. 15 is a partial view in section and in developed representation, of the receiving wheel provided with wire.

DETAILED DESCRIPTION OF THE INVENTION

Figure 1:
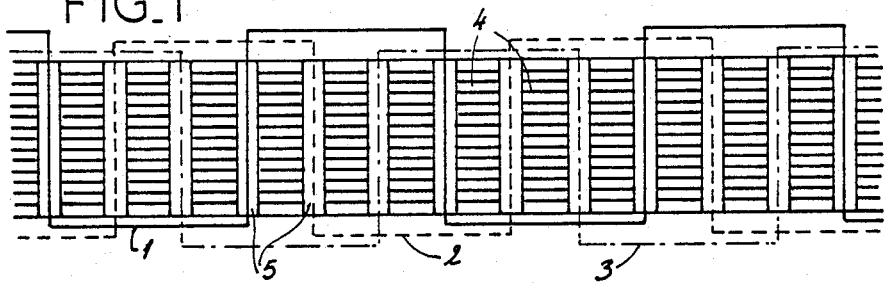
FIG. 1 is a schematic view, in developed form, of a "wavy" type winding.
Figure 2:
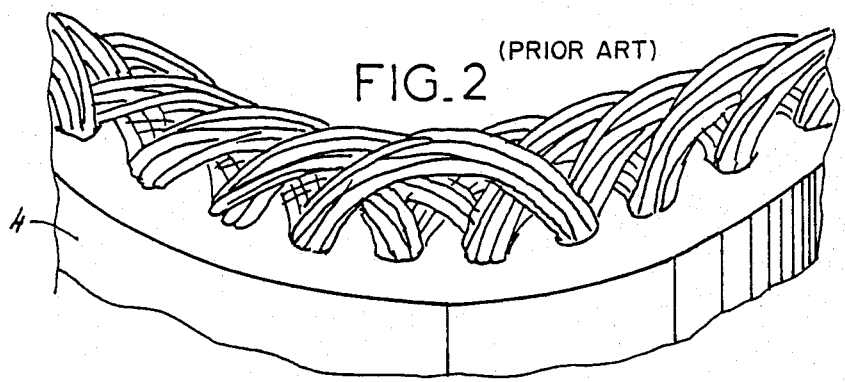
FIG. 2 is a partial perspective view of a stator with wavy winding with unarranged wires.
Figure 3:
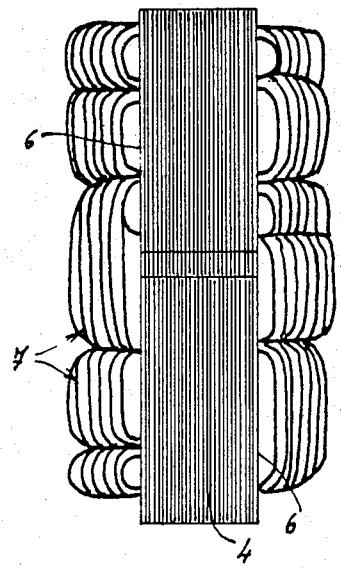
FIG. 3 is a side view of a stator with winding with arranged wires according to the invention.
Figure 4:
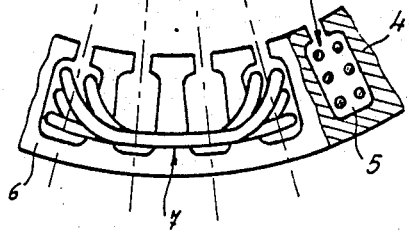
FIG. 4 is a partial end view of the stator according to the invention, with part in section.
Figure 5:
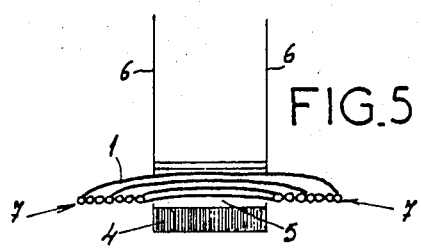
FIG. 5 is a partial view in section of the stator, the plane of section going longitudinally through one of the slots.

FIGS. 3 to 5 represent a three-phase alternator stator, formed by a stack of annular sheets 4 with slots 5 opened toward the axis and toward end faces 6 which receive the three-phase windings belonging to the "wavy" type whose principle has been previously mentioned with reference to FIG. 1, these figures showing only a phase winding 1 for greater clarity. The coil ends, i.e., the parts of phase winding 1 located outside slots 5 on both sides of sheet stack 4 form relatively flat spread-out layers 7 resulting from the arrangement of a certain number of wire parts on both sides. Further, as appears in FIG. 4 particularly on the right, the wire parts located inside slot 5 have a regular arrangement, these wire parts appearing like several superposed layers, with parallel wires juxtaposed in each layer. By way of example, three superposed layers can exist with, for each layer, two wire parts juxtaposed inside each slot 5.

To have the wire parts come in place side-by-side, in a well arranged manner, both inside slots 5 and to form spread-out layers 7 outside the slots, each phase winding 1, 2 or 3 is made like an electrically conductive wire section shaped in a zigzag, according to the principle illustrated by FIG. 6.

Zigzag wire section 8 is subdivided, in the lengthwise direction, into n successive series of indentations, each series comprising N number of indentations corresponding to one complete winding turn of the wire (in this regard, FIG. 6 is simplified and does not indicate the actual number of indentations). On the inside of each series of N indentations, all the indentations are exactly the same height. The height of the indentations increases or decreases from one series to the next, from one end of wire section 8 to its other end, which gives the unit a "stepped" appearance. Thus, the first series of indentations has a minimal height H1, the second series has a slightly greater height H2, etc., the next to the last series of indentations has a height $Hn-1$, and the last series has a maximum height Hn. The difference in height of the indentations, between two successive stages, is also distributed on each side, where it represents approximately a wire thickness e. In this way, at each winding turn the wire parts are placed, at the level of the winding ends, on the side of the corresponding wire parts belonging to the preceding winding coil.

Figure 8:
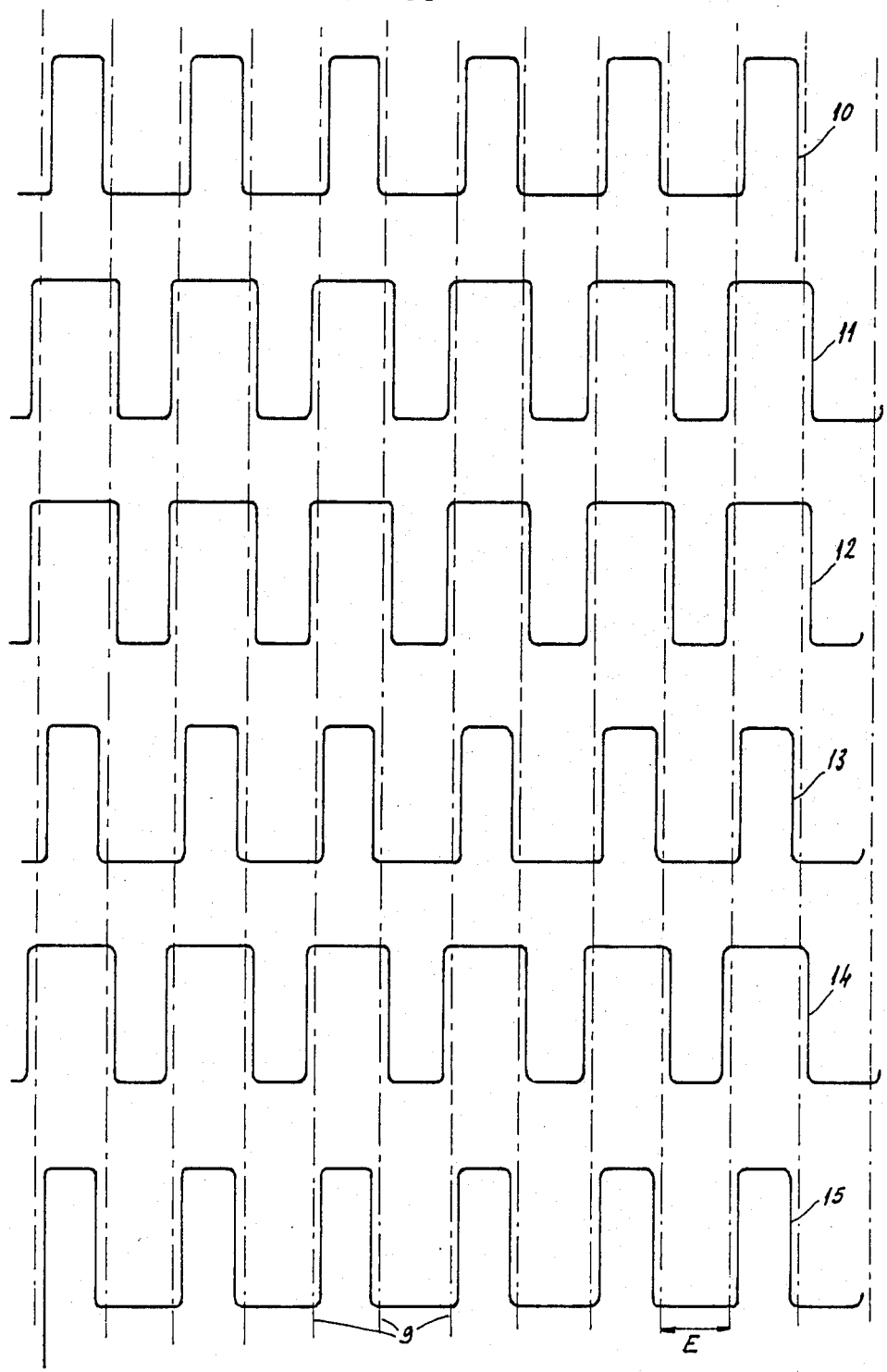
FIG. 8 is a diagram illustrating the features of the indentations of the wire section relating to their widths for successive coils of the phase winding.

Further, to obtain the correct arrangement of the wires inside slots 5, it is necessary to respect the exact relations in the width of the slots, as shown in FIGS. 7 and 8.

FIG. 7 thus shows in superposition two groups of indentations, corresponding to one of the wire layers housed in the slots, the dot-dash lines designated by 9 symbolizing the axes of slots 5 (ten for each phase in the particular example shown here). E designates the center distance of axes of two consecutive slots 5 intended for the same phase.

In the first group of indentations, six in number and corresponding to a first complete coil 10 of the winding, all the indentations have a width 1 slightly less than center distance of axes E of the slots. On the other hand, in the second group of indentations, also six in number and corresponding to following coil 11, width L of all indentations is slightly greater than center distance of axes E. The two wire portions 10 and 11 correspond respectively to these two groups of indentations, thus following parallel paths without intersecting. For the two wire portions 10 and 11 to be exactly juxtaposed, width 1 of the indentations of the first group is provided approximately equal to the center distance of axes E reduced by thickness C of the wire, while width L of the indentations of the second group is provided approximately equal to the center distance of axes E increased by thickness C of the wire.

FIG. 8 shows the generalization of this principle to all the superposed layers of wire parts, taking for example an embodiment with three superposed layers. Therefore, in this case there can be distinguished six successive groups of indentations which correspond to six wire portions, numbered from 10 to 15, or also with six coils when the winding is formed and wound.

These six groups of indentations are shown below one another, with marking of their arrangements relative to axes 9 of the slots just as in FIG. 7. For a good understanding of FIG. 8, it will be noted that the left end of each wire portion is connected to the right end of the following wire portion, shown immediately below. Certain features can also be noted toward these ends, corresponding to the passage from one layer to the next in the winding that has finally been put in place, as well as corresponding to the electric connections of the phase winding. In the example considered here, a total of 12×6=72 parallel wire parts formed and provided to be placed in twelve slots with, in each stator slots, six parallel wire parts distributed in three superposed layers.

Figure 9:
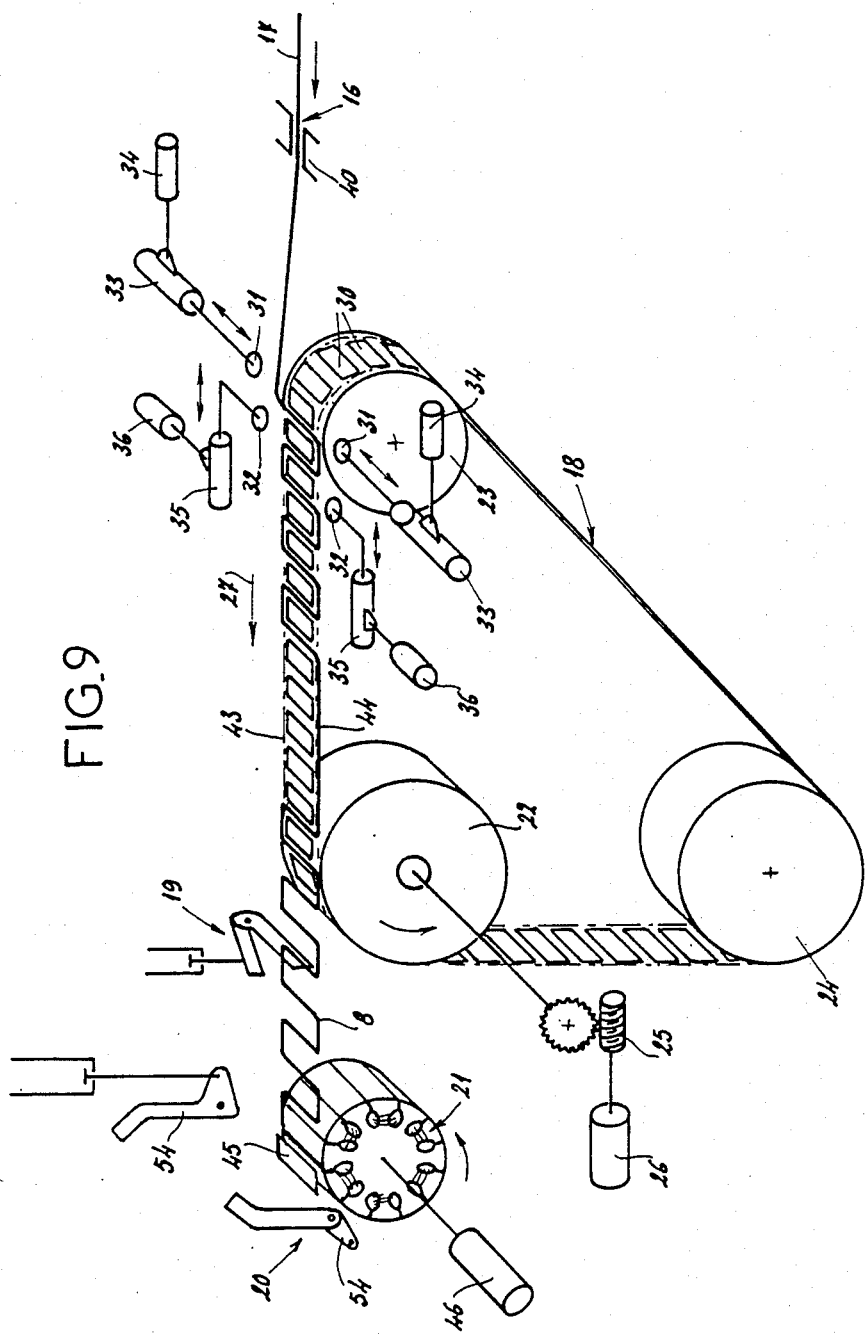
FIG. 9 is a schematic overall perspective view of the device according to the present invention.

FIG. 9 shows on the whole a device which makes the zigzag shaping of the wire possible as illustrated by the preceding figures, then the preparation of the wire for its insertion in the stator. The device comprises particularly: feeding means 16 for feeding of wire 17, coming from unwinding means (not shown); an endless chain 18 on which wire 17 is shaped in a zigzag; cutting means 19 which separate the wire 17, when it has been shaped, to obtain wire sections 8 already described above, each corresponding to a phase winding; picking means 20 for picking up wire sections 8 and inserting these wire sections 8 on a receiving wheel 21.

Endless chain 18, describing a slightly triangular shaped path, passes over a drive wheel 22, over a sprocket 23 and another wheel 24. Drive wheel 22 is coupled by a transmission mechanism 25 to a motor 26 which controls a step-by-step advance of endless chain 18. The useful part of this chain consists of the approximately horizontal carrying run extending between sprocket 23 and drive wheel 22, hence the advance of chain 18 is performed incrementally in the direction indicated by arrow 27.

The total length of endless chain corresponds approximately to the length of a phase winding shaped in a zigzag. As FIG. 10 also shows, chain 18 is formed by links 28 hinged to one another along axes 29. Each link 28 comprises, on its outside face, a part 30 in relief, rectangular in shape with rounded angles, constituting a template for the formation of an indentation. The set of links 28 with their templates 30 thus correspond to the totality of indentations to be made for the formation of a phase winding, the longitudinal and crosswire dimensions of each template 30 being determined as a function of the particular height and width of the corresponding indentations.

To apply wire 17 against the edges of the templates 30, the device also comprises on both sides of chain 18 in the area of sprocket 23, a first shaping roller 31 and a second shaping roller 32. First shaping roller 31 can be moved perpendicularly to the direction of advance 27 of chain 18 by being operated by a cylinder 33. The shaping roller 31 is further subjected to the action of a presser 34 acting in direction of advance 27 of chain 18. Second shaping roller 32 can be moved parallel to direction of advance 27 of chain 18, by being operated by a cylinder 35. The shaping roller 32 is also subjected to the action of a presser 36 acting perpendicular to the direction of advance 17 of chain 18.

Figure 10:
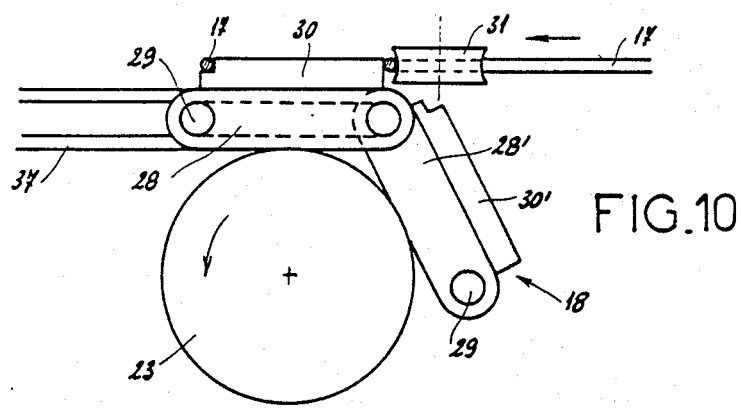
FIG. 10 is a partial side view of endless chain of the device represented in FIG. 9.

First two shaping rollers 31, located on both sides of endless chain 18, are alternately operated to apply wire 17 against the edges of the templates 30 oriented perpendicularly to direction of advance 27 of chain 18. As FIG. 10 shows, the planes of link 28, whose template 30, is in working position, and following link 28', with its template 30', form a rather large angle so that link 28' does not constitute any hindrance to the passage of shaping rollers 31. This is obtained by locating the arrival of wire 17 at endless chain 18 in the zone of sprocket 23, and by further providing, in this zone, suitable guides 37 for links 28, 28' by imposing a particular path on axes 29.

Two shaping rollers 32 are alternately operated to apply wire 17 against the edges of the templates 30 oriented parallel to direction of advance 17 of endless chain 18.

Figure 11:
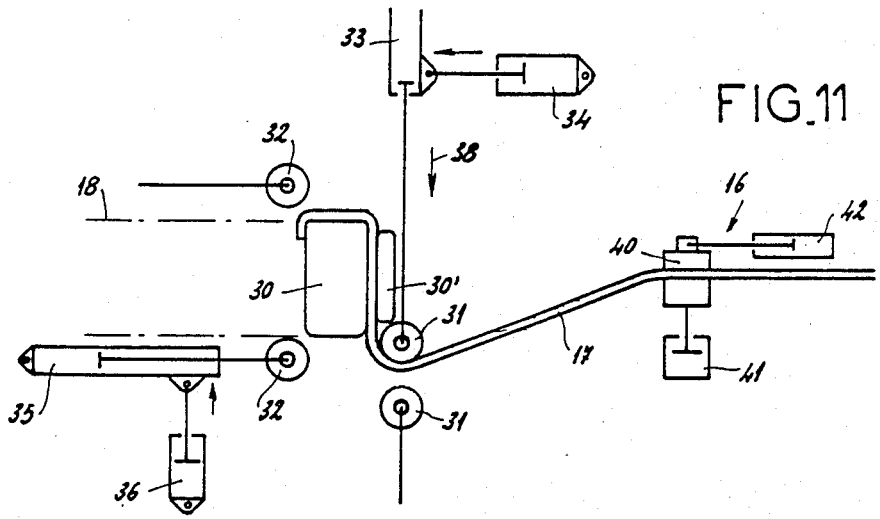
Figure 12:
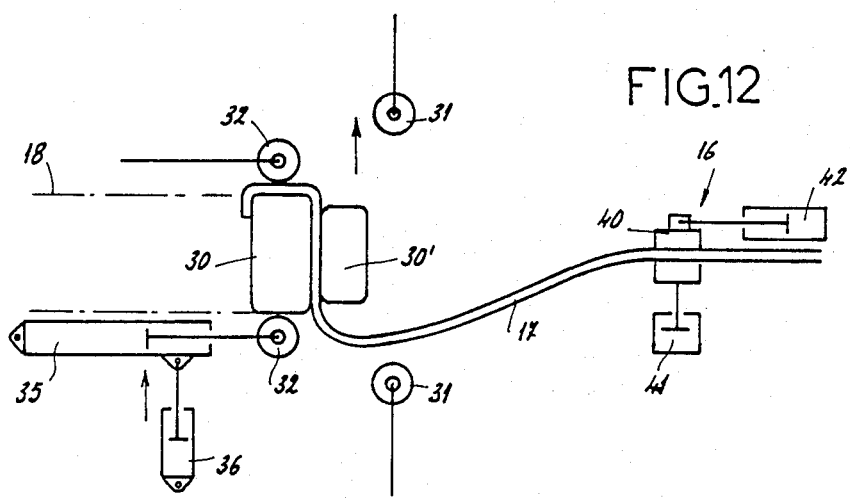

FIGS. 11, 12 and 13 show more precisely the method of forming indentations on the device described above.

FIG. 11 shows one of shaping rollers 31 in operation, moving along arrow 38 to apply wire 17 against the back edge of template 30 carried by a link. The shaping roller 31 is then brought back, as shown in FIG. 12, and endless chain 18 is then advanced a step, so that template 30', carried by the following links takes the place previously occupied by template 30. In the following step, illustrated by FIG. 13, one of shaping rollers 32 is moved along arrow 39, to apply wire 17 against an edge of template 30', parallel to the direction of advance of chain 18. The same process is then performed by causing the other roller 31 to intervene to bring the wire from the other side of chain 18, then in causing the other shaping roller 32 to intervene.

FIGS. 11 to 13 further show feed means 16 of wire 17, which comprise a mobile clamp 40 whose opening and closing are caused by control means 41, and whose movement, parallel to wire 17, is controlled by a cylinder 42. Clamp 40 is locked on wire 17 and moved forward in coincidence with each incremental advance of endless chain 18 driven step-by-step. This clamp 40 remains open the rest of the time.

By successively shaping wire 17 on all templates 30 of endless chain 18, a zigzag wire is obtained corresponding to a phase winding. Endless chain 18, as shown in FIG. 9, still has an inactive zone 43 making it possible to go from forming a phase winding to forming the next phase winding by leaving, between two successive windings, a certain length of straight wire 44 without indentations.

The shaped wire leaves endless chain 18 in the vicinity of drive wheel 22 of this chain. It then reaches cutting means 19, which cuts it toward the middle of each length of straight wire 44. The wire is thus separated into wire sections 8, each corresponding to a phase winding, with ends provided for electric connections. These ends can be shaped here and stripped by means not shown.

Beyond cutting means 19, wire sections 8, suitably directed by guides 45, tangentially arrive at receiving wheel 21, driven in rotation by drive means 46 to be transferred onto this receiving wheel 21.

FIGS. 14 and 15 show receiving wheel 21, provided with a wire section 8 transferred onto the wheel (wire section represented partially in FIG. 14). Receiving wheel 21 takes on the appearance of a body delimited on the outside by a cylindrical surface 47, whose diameter is slightly less than the inside diameter of the stator. On the periphery, receiving wheel 21 exhibits slots 48 which come out on cylindrical surface 47 and also on two annular end faces 49. The number of slots 48 of receiving wheel 21 and the angular pitch of these slots 48 correspond respectively to the number and to the angular pitch of slots 5 of the stator allocated to one of phase windings 1, 2 or 3 (twelve slots 48 in the example shown in FIG. 14).

Each slot 48 of receiving wheel 21 has a shape symmetrical relative to a median plane perpendicular to axis 50 of this receiving wheel 21. Central part 51 of each slot 48 has the shape of a relatively narrow slit; on both sides of this central part 51, slot 48 comprises two symmetrical parts 52 which gradually widen into a "V" shape. These widened parts 52 of slots 48 have, on end faces 49 of receiving wheel 21, openings with a contour 53 that is oval-shaped or the like, such as the shape of a pear or drop of water.

During transfer of a wire section 8 to receiving wheel 21, the parts of this wire section, oriented crosswise, are introduced, one after the other, into slots 48 of the receiving wheel 21. The complete transfer of wire section 8 requires several turns of receiving wheel 21, the wire thus being wound in several coils. The wire parts are thus superposed, and in a way are "stacked" in slots 48 as FIGS. 14 and 15 show which explain the role of widened parts 52 of slots 48. Widened parts 52 allow a slight deformation of the indentations, continuing to increase toward axis 50 and making it possible to compensate for the narrowing of slots 48 toward axes 50, therefore to admit 11 indentations whose pitch is constant. FIG. 15 further shows the offset between consecutive coils, approximately equal to the thickness of the wire, which is obtained in the area of the tops of the indentations on the outside of slots 48, and which results from the gradually increasing or decreasing of these indentations on previously formed wire section 8.

Referring again to FIG. 9, two mobile pressers 54 are also seen placed on both sides of the zone for transferring wire sections 8 to receiving wheel 21. These two mobile pressers 54 are alternately operated to form the parts of the indentations which remain on the outside of slots 48.

Figure 16:
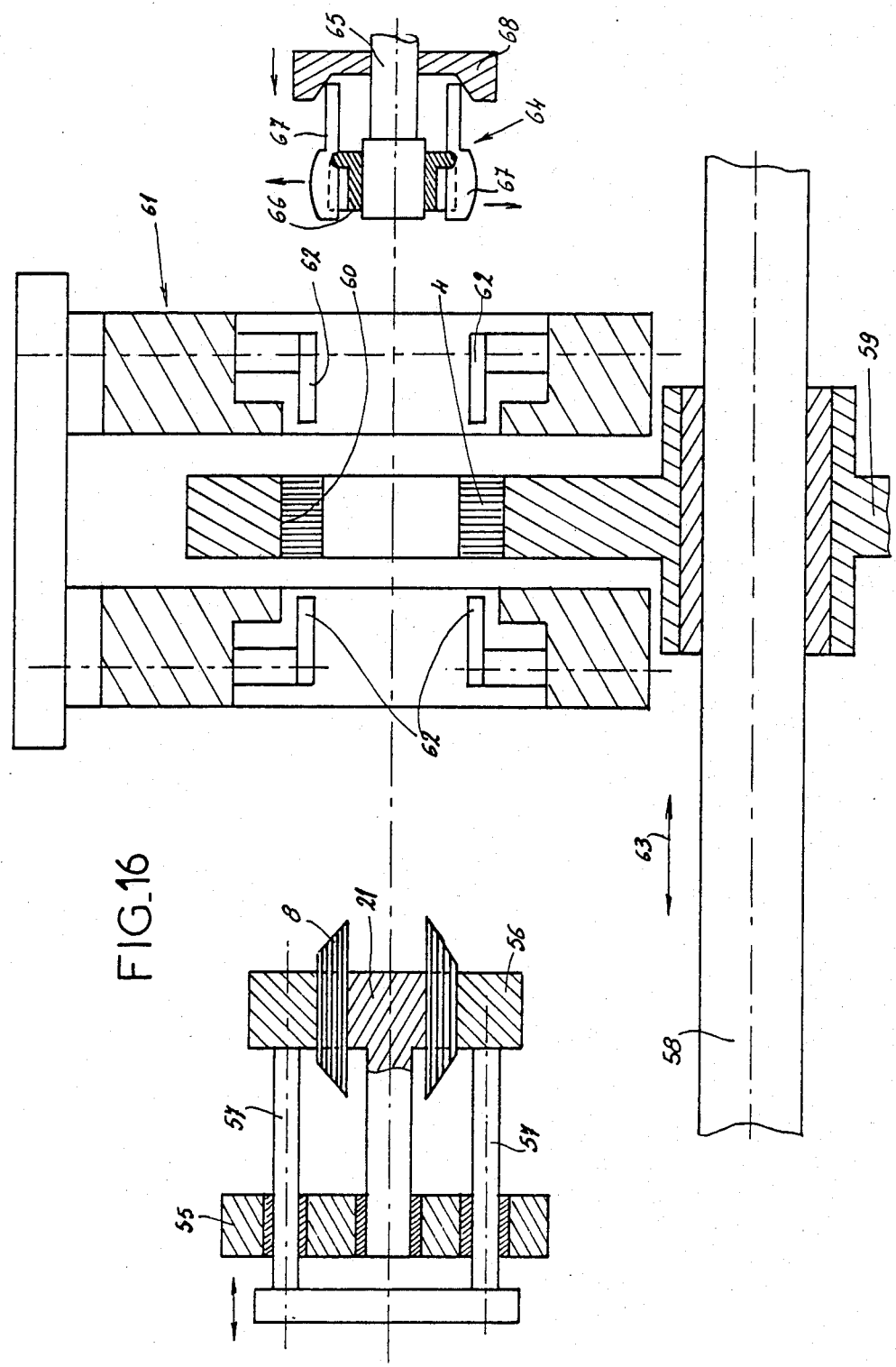
FIG. 16 is a schematic view in section of means for transferring the wire from the receiving wheel to the stack of stator sheets.

When receiving wheel 21 is provided with a complete wire section 8, a manipulator 55, which can be seen in FIG. 16, removes the receiving wheel 21 from the transfer zone 21. Manipulator 55 can be made in the form of a swinging arm provided to carry two receiving wheels to be able, at the same time, to feed another pickup wheel not provided with wire. For each receiving wheel 21, manipulator 55 comprises a cover 56 provided with a circular opening, and supported by columns 57 guided during sliding so that cover 56 can either surround receiving wheel 21 to guide the wire coming onto the wheel, or be removed from receiving wheel 21, which is necessary for the final transfer of the wire to the stack of sheets 4 of the stator.

FIG. 16 indicates, schematically, the means which makes the successive transfer of these similar wire sections 8 to the stack of sheets 4 of the stator possible, which will constitute, respectively, the three phase windings of the stator. This means comprises a shaft 58 carrying a rotary circular plate 59, provided with several openings 60 each able to receive a stack of sheets 4. A mechanism 61 is placed on the side of shaft 58 and is provided with expelling elements 62 placed as a crown on both sides of plate 59. The unit formed by plate 59 and mechanism 61 can be moved in translation to describe a back-and-forth movement along arrow 63, which brings it closer to or farther away from manipulator 55. During the approaching movement, receiving wheel 21 provided with a wire section 8 engages in the stack of sheets 4, carried by plate 59 and suitably positioned angularly, cover 56 retracting when receiving wheel 21 penetrates into the stack of sheets 4. Expelling elements 62 are then operated and describe a rectangular movement during which they are axially introduced into slots 48 of receiving wheel 21. They are then moved radially to extract the wire parts housed in slots 48 of receiving wheel 21 and to cause these wire parts to penetrate into the correspondingly placed stator slots.

Rotary plate 59, after transfer of the wire by mechanism 61, makes it possible to bring the stator to other work stations where the following steps can successively be performed: compacting of the layers of wire in the direction of the bottoms of the stator slots, putting the slot closing wedges into place, and a removal of the finished stators. The result of the final transfer of the wire and of the optional compacting, performed successively for each phase winding, is a stator with coil ends spread out in layers and with wires arranged on the inside of the slots, as illustrated by FIGS. 3 to 5.

In FIG. 16, on the right, particular means 64 are shown which can be used, in expelling elements 62, to perform the compacting. A mandrel 66 is mounted on a central support shaft 66 exhibiting, on its periphery, slits which each receive a swinging shaped blade 67. Shaft 65 also carries an axially mobile plate 68, which exhibits a tapered wall working with the ends of blades 67. After transfer of a phase winding into the stack of sheets 4, and if this phase winding requires a compacting, means 64, which have just been described are brought together and, by an axial movement of plate 68, blades 67 are swung so as to act on the wire and cause this wire to be correctly placed on the inside of the notches.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A process for winding a stator of an electric rotating machine with a wavy-type winding, said stator comprising an arrangement of wires comprising first portions of phase windings located outside of slots of the stator forming spread-out layers with said wires being arranged in a side-by-side relationship to one another laying substantially flat against an outside surface of the stator, and second portions of phase windings located inside the slots, said second portions appearing as several superposed layers of juxtaposed parallel wires passing through the slots, said wires being formed outside the stator, followed by placing the wires in the slots of the stator, said process comprising the steps of:

outside the stator, shaping an electrically conductive wire in a zig-zag form by making indentations in the wire having increasing and decreasing heights and preset widths;

cutting the wire shaped in a zig-zag form into sections whose respective lengths correspond to that of phase winding of the stator, winding each of said wire sections in several turns on a temporary support by superposing the indentations of increasing or decreasing heights; and axially introducing said temporary support having said wire sections wound thereon into a stack of sheets of the stator, and then transferring said wire sections from the temporary support to the slots of the stator in a radial movement direction.

2. The process for winding a stator according to claim 1, wherein the step of shaping said electrically conductive wire comprises the step of shaping said wire with a successive series of indentations, each series comprising a predetermined number of indentations, each of the indentations in a given series having the same height, and wherein the height of the indentation in the series increases or decreases from one series to the next.

3. The process for winding a stator according to claim 2, wherein the difference in height of the indentations between two successive series is, one each side, approximately equal to thickness of the wire.

4. The process for winding a stator according to claim 1, wherein the step of shaping said electrically conductive wire comprises the step of shaping said wire with successive groups of indentations having different indentation widths, the indentation widths being determined such that the wire portions are exactly juxtaposed in each of a number of wire layers finally being placed in the slots of the stator.

5. The process for winding a stator according to claim 4, wherein each layer of wires is formed with two juxtaposed wire portions in each slot, wherein the step of shaping said wire comprises the step of forming successively, to obtain each layer, a first group of indentations of determined height and width slightly less than center distance between axes of two consecutive slots intended for the same phase, than a second group of indentations of the same height as the preceding one but of a width slightly greater than said center distance of axes so that the two wire portions correspond respectively to these two groups of indentations, following parallel paths, without crossing each other.

6. The process for winding a stator according to claim 4, wherein each layer of wires is formed with two juxtaposed wire portions in each slot, wherein the step of shaping comprises the step of forming successively to obtain each layer, a first group of indentations of determined height and width slightly less than center distance of axes so that the two wire portions correspond respectively to these two groups of indentations, following parallel paths, without crossing each other.

7. The process for winding of a stator according to claim 4, wherein the width of the indentations of one of the two groups is approximately equal to said center distance of axes reduced by the thickness of the wire, and the width of the indentations of the other group is approximately equal to said center distance of axes increased by the thickness of the wire.

8. The process for winding a stator according to claim 7, wherein the width of the indentations of one of the two groups is approximately equal to said center distance of axes reduced by the thickness of the wire, and the width of the indentations of the other group is approximately equal to said center distance of axes increased by the thickness of the wire.

9. The process for winding of a stator according to claim 1, wherein the step of transferring comprises the steps of inserting the wire sections corresponding to the various phases successively in the slots of the stator by means of the temporary support, and optionally compacting the wire at the bottom of the slots.

* * * * *